United States Patent Office 3,197,792
Patented Aug. 3, 1965

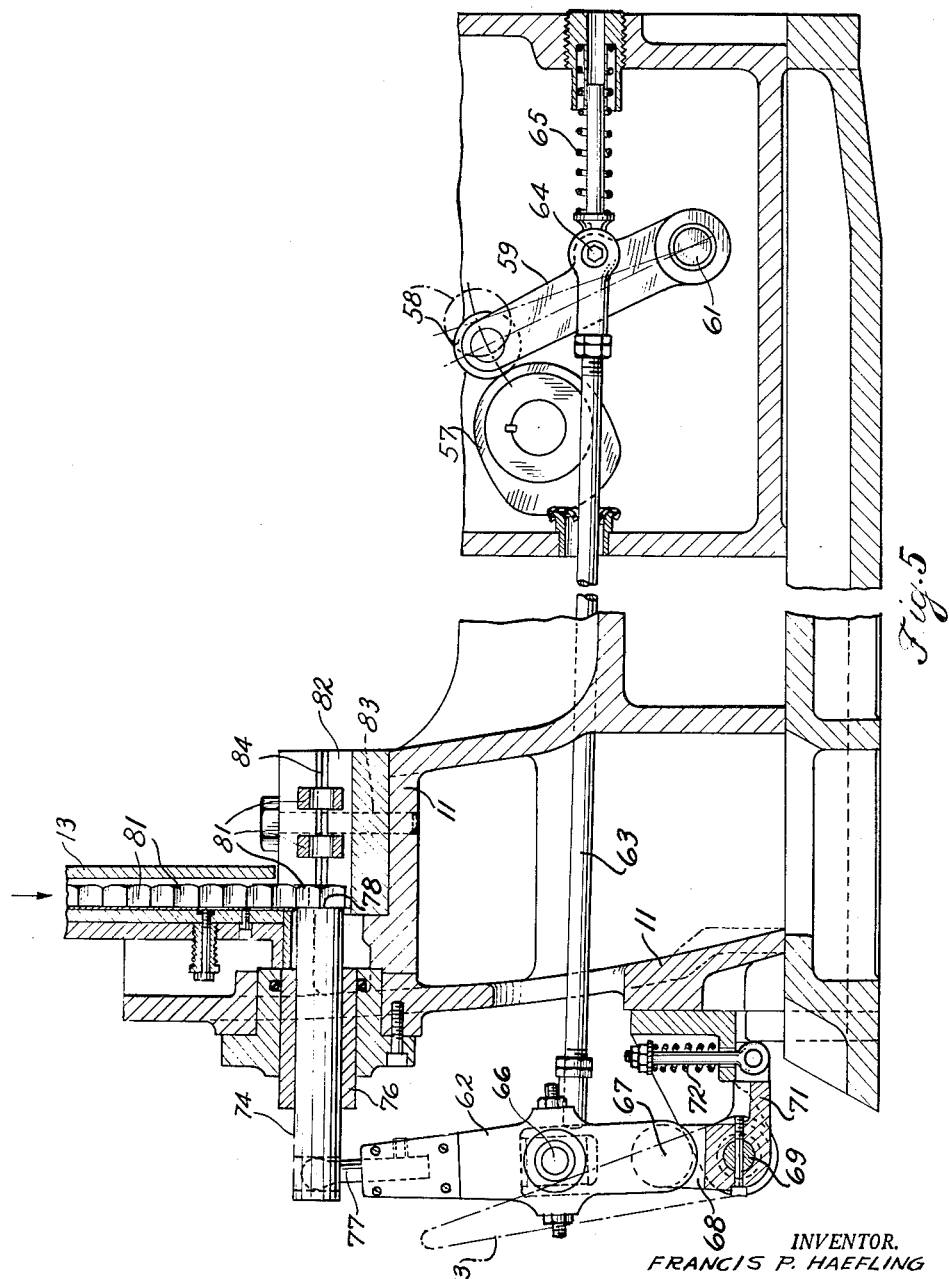

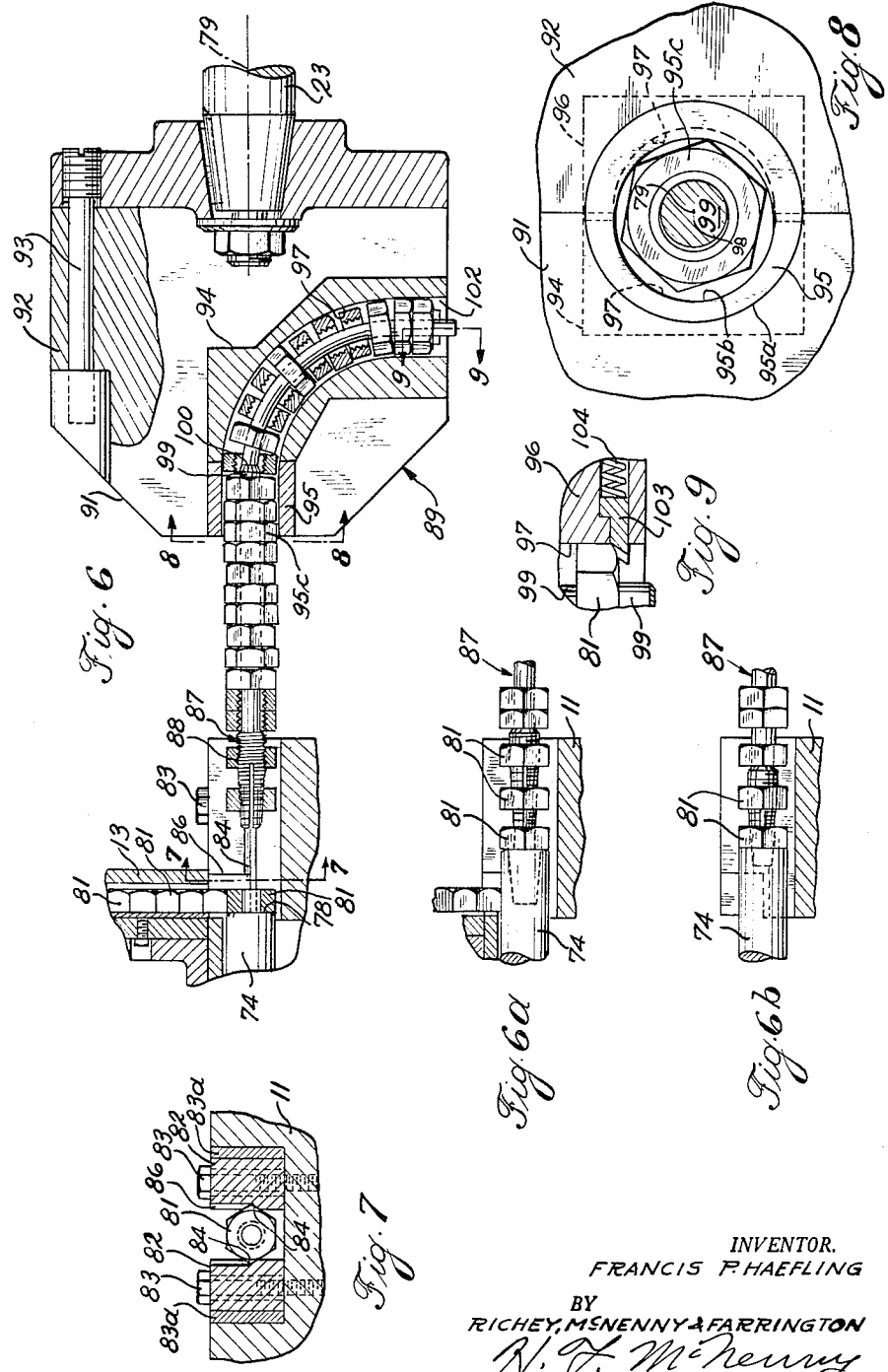

3,197,792
FLOATING TAP TYPE NUT TAPPER
Francis P. Haefling, Tiffin, Ohio, assignor to The National Machinery Company, Tiffin, Ohio, a corporation of Ohio
Filed Feb. 24, 1961, Ser. No. 91,378
7 Claims. (Cl. 10—139)

This invention relates generally to nut tapping devices and more particularly to a nut tapper suitable for threading nuts with improved accuracy.

It the past it has been customary to use floating tap type nut tappers wherein the tap proper is supported and guided by previously tapped nuts moving along a shank having a 180° bend or a 90° lateral section. Such nut tappers, however, have not been completely satisfactory for the cutting of threads in nuts having very closely limited dimensional requirements. Difficulty has occurred in prior art machines in maintaining the tap direction relative to the nut blank so that the threaded hole is exactly perpendicular to the pressure face of the nut. Prior machines also have not been completely satisfactory in providing tapped nuts of high dimensional accuracy since the nut blanks or the tap are not positively maintained in the required position so that run out occurs which causes the threads to be improperly formed and causes excessive tap wear.

In a nut tapper incorporating this invention, the nut blank is held in a stationary position against an accurately formed face which engages a face of the nut while the tap is started through the nut. This insures that the nut is properly positioned against a correct referenced surface and therefore results in a finished nut wherein the tapped hole is perpendicular to the face of the nut. Since the nut is held stationary during the initial portion of the tapping operation, the tendency to wobble or move out of the proper position is substantially eliminated.

The tap is also guided in the manner which insures that the cutting portion of the tap rotates about the true center of rotation so that run out and the attendant enlarged thread and excessive tap wear are eliminated. The preferred guide element provides an eccentric guide surface so that the shank of the tap is properly centered in spite of the provision of the necessary clearances between the threaded nuts and both the tap shank and the guide surface.

After the tap has been started through the nut and sufficient threads are formed to insure accurate positioning, the nut is withdrawn along the stationary guide by withdrawing the tap so that the cycle can be shortened and several nuts positioned along the cutting end of the tap simultaneously.

By utilizing a tapper incorporating this invention, it is possible to produce nuts having threads with less run out and more accurate thread form while reducing tap wear, thus increasing the life of the machine elements. It actual practice it has been found that the high production nut tapper incorporating this invention is capable of operating to produce nuts of the highest class of dimensional specifications.

It is an important object of this invention to provide a nut tapper wherein the nut is held stationary against a gaging face which engages a face of the nut while the thread is being started by the tap and then moved axially along the guide as the tap withdraws simultaneously finishing the formation of the nut thread.

It is another object of this invention to provide a floating tap type nut threader wherein the guides for supporting the tap are eccentrically formed to insure exact positioning of the tap so that its axis is coaxial with the axis of tap rotation.

It is another important object of this invention to provide a nut tapper incorporating an L-shaped tap accurately guided so that the cutting end portion of the tap is coaxial with the axis of rotation, thus eliminating run out and excessive wear.

It is another important object of this invention to provide an L-shaped guide for a floating tap formed of two cooperating members mounted in a spaced relationship and formed with guiding walls of semi-circular cross-section wherein the required clearance is provided by spacing the two guide elements.

It is still another object of this invention to provide a nut tapper wherein the nut is held stationary during the initial portion of the threading operation and moved axially but restrained against rotation during the finishing portion of the tapping operation.

Further objects and advantages will appear from the following description and drawings wherein:

FIGURE 5 is a fragmentary section with parts removed for purposes of illustration showing the pusher and pusher drive;

FIGURE 6 is a cross-section of the tap and tap guide showing the relationship of the tap elements and the guides for the tap and nuts;

FIGURE 6a is a fragmentary section showing the position the elements assume when the pusher advances a nut blank to its fixed position prior to the movement of the tap into the nut;

FIGURE 6b is a view similar to FIGURE 6a illustrating the position the elements assume when the thread is started through the nut by threading the tap a substantial portion into the nut;

FIGURE 7 is a cross-section taken along 7—7 of FIGURE 6 illustrating the structure of the stationary guides;

FIGURE 8 is a cross-section taken along 8—8 of FIGURE 6 illustrating the structure of the tap guide; and FIGURE 9 is a fragmentary section taken along 9—9 of FIGURE 8 showing the spring latch used to retain the nuts against centrifugal force.

Figure 1:
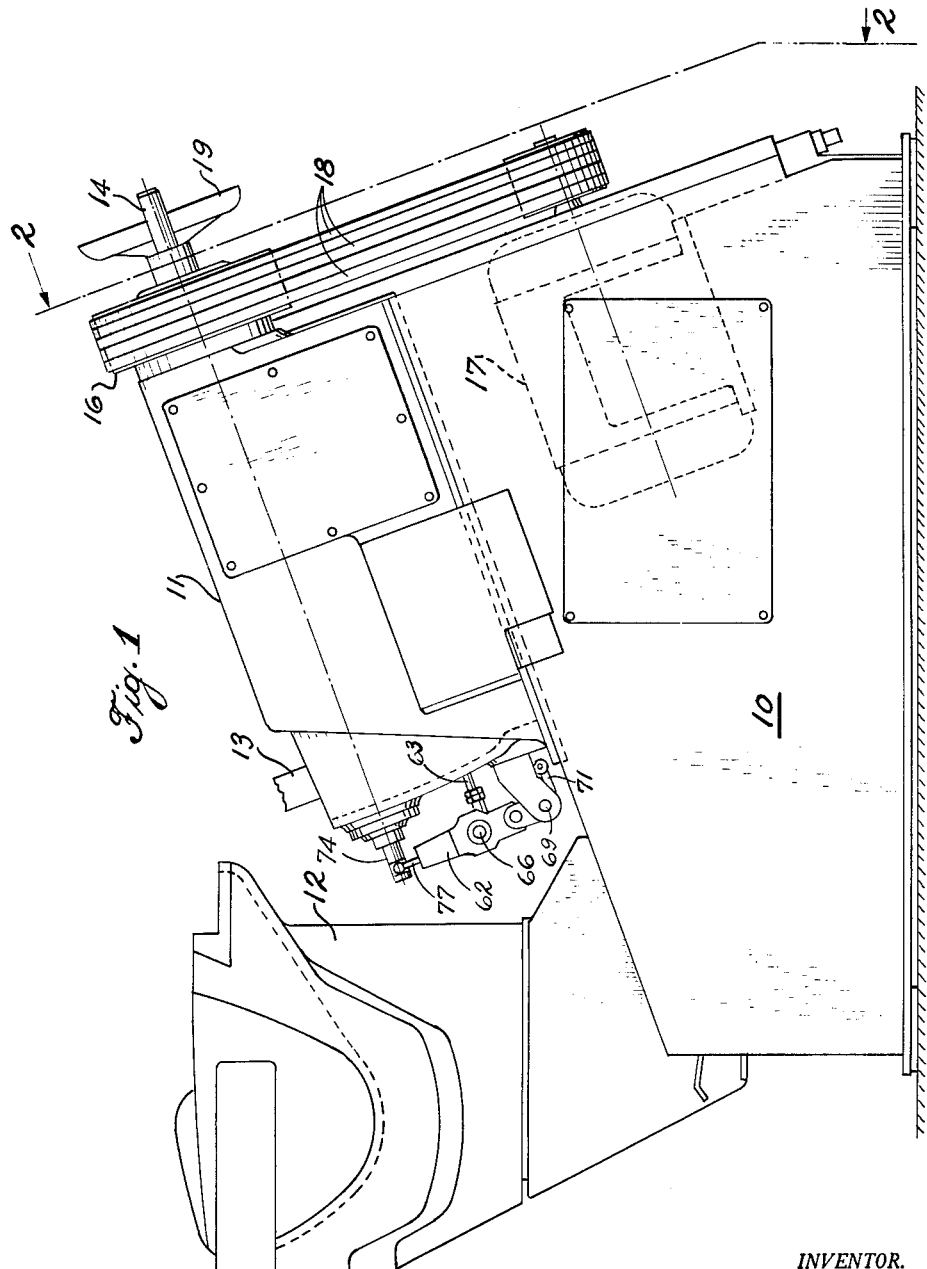
FIGURE 1 is a side elevation illustrating a double spindle nut tapper incorporating this invention.
Figure 2:
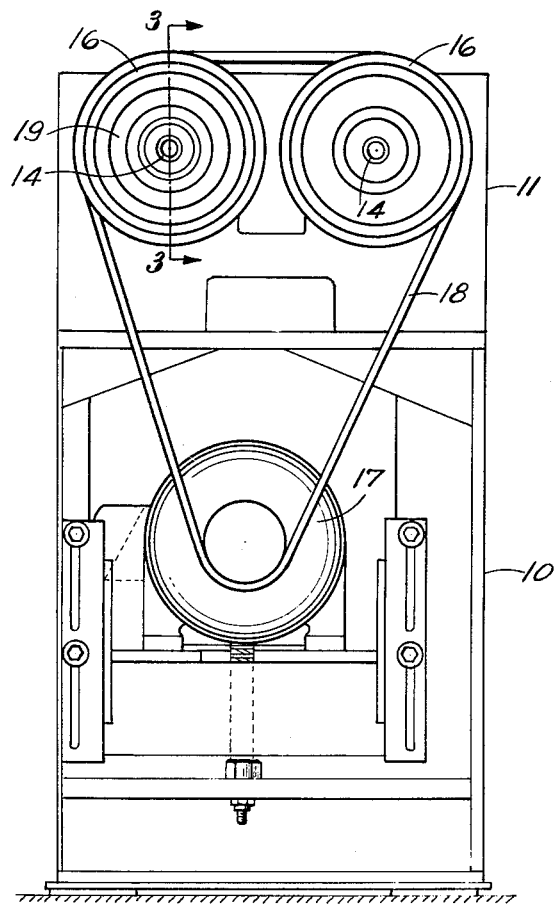
FIGURE 2 is a side elevation taken along 2—2 of FIGURE 1.

A double spindle nut tapper incorporating this invention is illustrated in its entirety in FIGURES 1 and 2. The machine includes a base 10 on which is mounted a tapper frame 11 and a nut sorter 12 which operates to properly orient nuts and feed them from a hopper into feed chutes 13. The machine is provided with two similar spindle drive assemblies 14 mounted in parallel relationship as illustrated in FIGURE 2. A drive pulley 16 is mounted on each of the drive assemblies 14 and is connected to an electric drive motor 17 by a V type drive belt 18. A hand wheel 19 is mounted on one of the drive assemblies 14 to permit the manual rotation of the machine for adjustment purposes.

The machine is provided with two cam drive linkages associated with each of the spindles, the first of which reciprocates the associated spindle and the second of which reciprocates the pusher associated with the spindle. The two cam drive linkages are the same for both spindles so only one will be discussed in detail with the understanding that the discussion applies equally to both spindles and spindle drives.

Figure 3:
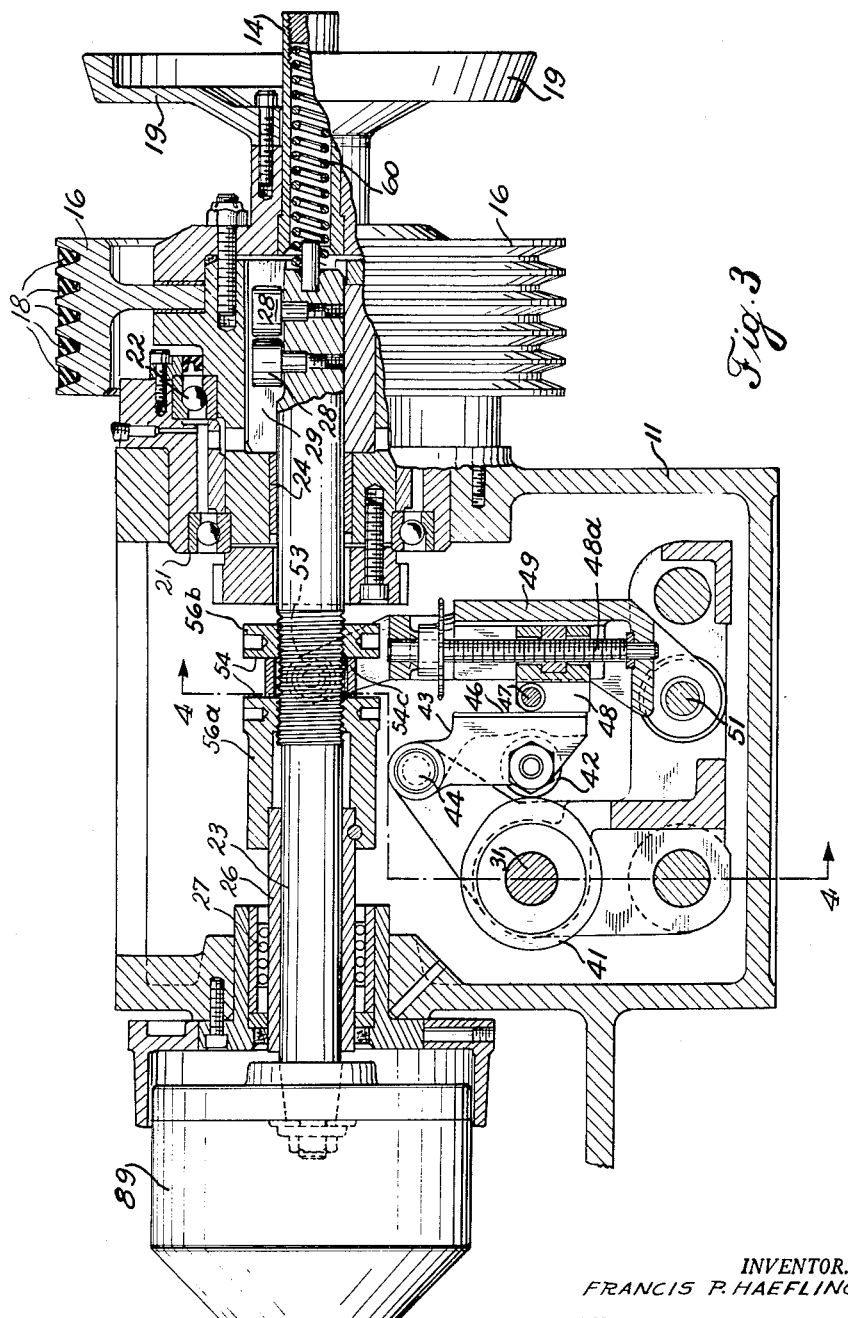
FIGURE 3 is a cross-section taken along 3—3 of FIGURE 2 illustrating a spindle drive and the cam linkage for reciprocating the spindle.
Figure 4:
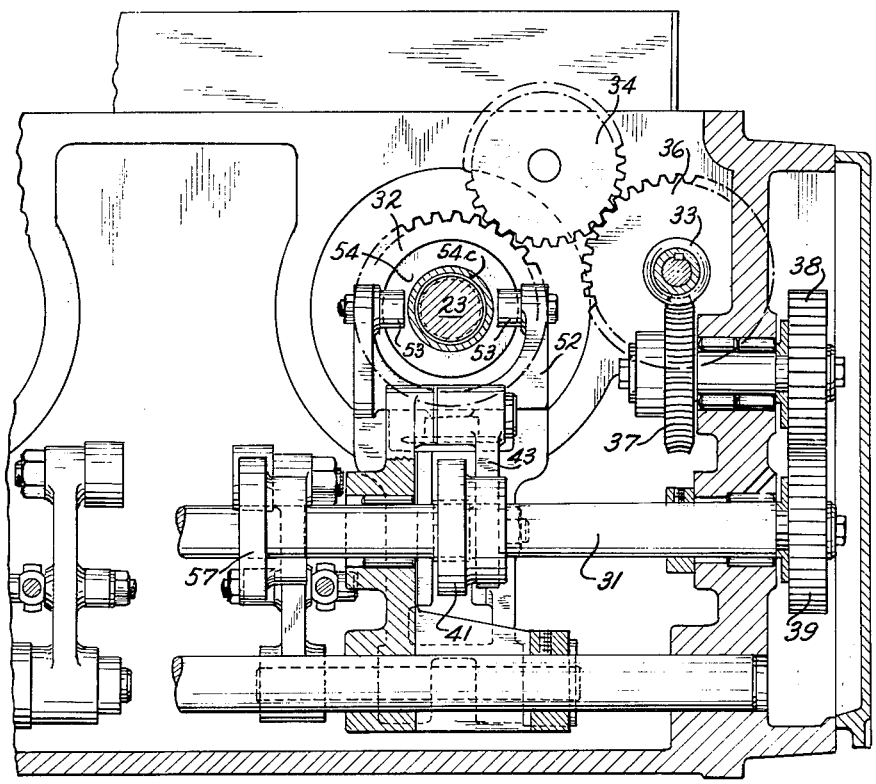
FIGURE 4 is a cross-section taken along 4—4 of FIGURE 3 illustrating the camshaft drive gearing.

Referring to FIGURES 3 and 4 the spindle drive assembly 14 is journaled in the frame 11 within spaced roller bearings 21 and 22. These bearings lock the spindle drive assembly 14 against axial motion relative to the frame 11 while permitting relative rotation. The spindle proper 23 is mounted for rotation with the spindle drive assembly and axial movement relative thereto. A sleeve bearing 24 in the spindle drive assembly supports one end of the spindle and the other end is supported within a cylindrical bearing member 26 journaled in an antifriction bearing 27 which provides both rotational and axial freedom. The bearing 27 is in turn mounted in the frame 11. The drive connecting the spindle 23 and the spindle drive assembly 14 includes a pair of rollers 28 mounted on studs threaded into the spindle 23 which engage and roll along an axially extending groove 29 formed in the spindle drive assembly 14. Thus, the spindle 23 is mounted for rotation with this spindle drive assembly but is free to move axially relative thereto.

In order to reciprocate the spindle 23 in a manner timed with the rotation thereof, a cam driven linkage is used. A cam shaft 31 is journaled in the frame 11 and is connected to be driven by a gear 32 on the spindle drive assembly through a gear reduction illustrated in FIGURE 4. This gear reduction includes a worm gear 33 driven by a pair of spur gears 34 and 36. The worm gear 33 in turn drives a worm wheel 37 which is connected to drive the cam shaft 31 through a pair of spur gears 38 and 39. A single cam shaft 31 is used to drive the associated linkages for both spindles 23. Since both spindles are driven at the same speed by a single motor and the cam shaft is driven by the gear reduction from one spindle drive assembly, proper synchonization of the machine is provided.

A spindle reciprocating cam 41 is mounted on the cam shaft 31 and is engaged by a cam follower 42 mounted on a cam follower arm 43 best illustrated in FIGURE 3. The cam follower arm 43 is pivoted for rotation about a fixed axis 44 and is provided with a straight side face 46. A roller 47 journaled on an adjusting block 48 engages the side face 46 to transmit oscillating movement of the cam follower arm 43 induced by the cam 41 to a spindle drive link 49. The spindle drive link 49 is journaled for motion about a fixed pivot axis 51 and is formed with a forked upper end 52 best illustrated in FIGURE 4 on which are mounted opposed rollers 53. The rollers 53 are positioned within an annular groove having side faces 54 which are engaged by the two rollers 53. The ring elements 56a and 56b which provide the side faces 54 are locked against relative movement on the spindle 23 by being tightened against a spacer 54c so that when the spindle drive link 49 oscillates back and forth the spindle 23 is moved axially.

The adjustment block 48 on which the roller 47 is mounted is mounted on the spindle drive link 49 for vertical adjustment relative thereto with its vertical position controlled by a screw 48a. In operation, rotation of the cam 41 produces oscillating movement of the cam follower arm 43 through the engagement of the cam follower 42. This oscillating movement is in turn transmitted to the spindle drive link 49 by the engagement between the side face 46 and the roller 47. The oscillation of the spindle drive link 49 is in turn transmitted to the rotating spindle 23 by the rollers 53 by virtue of their engagement with the side face 54. Those skilled in the art will recognize that a given cam will produce a given oscillating movement in the cam follower arm 43. However, by vertically adjusting the adjustment block 48 and in turn the roller 47, the point of engagement between the roller 47 and the side face 46 can be changed so that the oscillation of the spindle drive link 49 can be accurately adjusted. This accurate adjustment, of course, is achieved by rotating the screw 48a.

A spring 60 illustrated in FIGURE 3 extends between the spindle 23 and the spindle drive assembly and operates to bias the spindle in the feed direction for tapping. The action of the cam 41 and the connecting linkage overcomes this spring force to produce the necessary spindle reciprocation. This structure prevents damage to the machine in the event of jamming since the maximum feed force on the tap is the force produced by the spring 60.

Referring now to FIGURES 4 and 5, a pusher feed cam 57 is also mounted on the cam shaft 31. A cam follower 58 is mounted on a cam follower arm 59 and produces oscillating movement thereof about a fixed pivot axis 61 by virtue of its engagement with the cam 57. A spring 65 operates to maintain the cam follower 58 in engagement with the cam 57. The follower arm 59 is connected to a pusher drive arm 62 by a tie bar 63 which is pivoted at 64 on the follower arm 59 and at 66 on the pusher drive arm 62. Thus the oscillating movement induced in the follower arm 59 by the cam 57 is transmitted to the pusher drive arm 62.

The pusher drive arm 62 is pivoted for rotation about a pivot axis 67 on an overload release member 68. The release member 68 is in turn mounted on a pivot 69 on the frame 11 and is formed with a stop arm 71 normally held in engagement with the frame 11 by a spring 72. Therefore in normal operation the pivot axis 67 is fixed relative to the frame but if a jamming or other malfunction occurs which overloads the linkage, the overload release member 68 rotates in a clockwise direction around its pivot 69 against the action of the springs 72 preventing damage to the machine. An arm 73 shown in phantom in FIGURE 5 can be mounted on the release member 68 to permit manual operation thereof and thereby permit manual movement of the pusher drive arm 62.

A pusher element 74 is journaled for reciprocating movement in a sleeve bearing 76 mounted on the frame 11 in such a manner that the pusher reciprocation is along the axis of rotation 79 of the spindle 23. The pusher 74 is formed with a slot in which a drive element 77 is positioned. The drive element 77 is in turn mounted on the pusher drive arm 62 so that oscillating movement of this arm about its pivot 67 causes reciprocating movement of the pusher 74.

The pusher 74 is formed with an end face 78 accurately formed to be perpendicular to the axis 79 which is the axis of rotation of the spindle 23. When the pusher 74 is in the rearward position illustrated in FIGURE 5, the end face 78 is clear of the chute 13 so that a nut blank 81 can drop down from the chute 13 into a position in front of the end face 78. In some types of nuts, the nut blank should be oriented so that the pressure face 82 is on the left side in engagement with the pusher 74. When this is the case, the nut sorter 12 must be arranged to provide the orientation.

When the nut blank 81 drops down into a position in front of the pusher 74, it is supported by adjustable guides 82 as best illustrated in FIGURE 7. These guides which are positioned in the frame 11 of the machine by lock bolts 83 and spacers 83a, are formed with axially extending grooves 84 which engage opposite points of the hex of the nut blank 81. The left end of each guide 82 as viewed in FIGURE 6 is cut with an open portion 86 open down to the apex of the V-grooves 84 so that a nut can freely travel down the chute 13 but will engage the bottom walls of the opposed grooves 84 and be supported in proper position for threading. As the pusher 74 moves toward its forward or advanced position, the nut blank 81 supported in the grooves 84 is moved forward along the guides 82 to a position where it is restrained against rotation by the grooves in the guides 82. Since the guides 82 are formed with their groves 84 so that the grooves are contained within a plane through the axis of rotation 79, a single set of guide members 82 can be used for any size nut. When different size nuts are to be tapped, it is merely necessary to loosen the lock bolts 83, and substitute spacers 83a and move the guides 82 laterally to the correct position for the new nut size.

A tap 87 is provided with a forward cutting end 88 positioned to cut threads and nut blanks 81 retained in the guides 82. The tap 87 is supported for rotation by the spindle 23 by a head assembly 89 mounted on the end of the spindle 23. The head assembly includes two jaw members 91 and 92 pivotally connected by a hinge pin 93. A bolt on the opposite side of the jaw members (not shown) cooperates with the hinge pin 93 to clamp the two jaw members 91 and 92 together in a face to face relationship.

In order to guide the tap shank 99 so that the cutting end 88 is coaxial with the axis of tap rotation 79, an eccentric guide 95 and a pair of guide blocks 94 and 96 are mounted in the jaw members 91 and 92. The guide bushing 95 is formed with an outer cylindrical surface 95a mounted coaxial with the axis 79. The bushing is also formed with an internal cylindrical guide surface 95b eccentric of the axis 79 as illustrated in FIGURE 8. The guide surface 95b is sized to provide clearance with the threaded nuts 95c moving along the shank 99 of the tap to permit their free movement through the guide bushing while providing proper guiding action. This clearance has been enlarged for purposes of illustration in FIGURE 8. In addition the shank of the tap must be sized to provide clearance between the tap shank 99 and the threads in the nuts 95c. Here again, the clearance has been exaggerated in FIGURE 8. The amount of eccentricity of the guide surface 95b from the axis of rotation 79 is preferably equal to one half of the sum of the clearances between the nuts 95c and the guide surface 95b and the clearance between the tap shank 99 and the threads of the nut 95c. When this relationship is provided and a lateral force is transmitted between the shank 99 and the guide wall 95b through the nut 95c, as will be discussed in detail below, the straight section of the tap shank 99 is located coaxial with the axis of rotation 79.

The guide blocks 94 and 96 are mounted with one on each of the jaw members 91 and 92. Each of the guide blocks 94, 96 is formed with a semi-circular cross-section groove 97 which turns at right angles from the forward end which is aligned with the axis 79 to the outer end which is at right angles to the axis 79. The two grooves 97 in the guide blocks 94 and 96 each have a semi-circular cross-section which would produce a circular cross-section passage if the two guide blocks were mounted in a face to face engaged position. The guide blocks, however, are not mounted in such an engaged position but rather are mounted as illustrated in phantom in FIGURE 8 wherein the guide block 96 is mounted in the jaw member 92 so that its center of curvature is located in a plane containing the axis of the spindle rotation 79. The guide block 94, however, is mounted in the jaw member 92 so that its center of curvature 98 is displaced to one side of the axis 79 and parallel to the center of curvature of the guide block 96. This provides the necessary clearance so that the nut blanks 81 can pass around the curved section of the guides. The diameter of the curved section of the shank 99 is reduced at 100 to provide additional clearance so that the nuts can freely move along to the end of the shank. This structure permits the use of small clearances between the nuts 95c and the bushing 95 and between the nuts 95c and the straight portion of the shank 99 to provide accurate guiding of the tap while still providing the necessary larger clearance for the curved portion. The radius of curvature of the grooves in the guide blocks 94 and 96 should be substantially equal to the radius of the guide surface 95b and the spacing between the block substantially equal to the eccentricity of the bushing 95.

Those skilled in the art will recognize that a torque is applied to the tap through the medium of nut blanks previously threaded and positioned around the shank 99 of the tap 87 to provide the necessary torque which produces tap rotation for threading. This torque results from a force couple which causes the nut blanks 95c in the guide bushing 95 to engage one side as illustrated in FIGURE 8. The nuts at the rearward end 102 will engage the groove in the guide block 94. These opposite side engagements provide the required torque to drive the tap into the nuts. The structure of the guides and the formation of the grooves 97, insures that the nuts engaging the bushing 95 and guides 94 and 96 position the shank so that the cutting end 88 rotates accurately about the axis 79 while still providing the necessary clearance to permit the travel of the nut blanks along the shank 99 of the tap.

In order to prevent the nut blanks 81 from being thrown from the outer end of the tap shank, a detent 103 is mounted to project through the wall of the grooves 97 and engage a nut blank 81 as illustrated in FIGURE 9. The detent 103 is spring biased to a forward position by a spring 104 with sufficient force to overcome the action of the centrifugal force. This insures that a full load of nut blanks is provided along the length of the shank 99 so that the tap will be accurately guided in its operation.

The operation of the machine is as follows. The two cams 41 and 57 are shaped and positioned so that their associated drive linkages move the pusher 74 and the tap 87 to the position shown in FIGURE 6 at the beginning of the cycle of operation. At this time the pusher 74 is located so that its end face 78 is clear of the chute 13 and one of the nut blanks 81 drops down onto the guides 82. The tap 87 is also in its retracted position.

As soon as the nut blank 88 is positioned in front of the pusher 74, the pusher moves forward to the position shown in FIGURE 6a at which time the nut blank 81 is retained against rotation by the guides 82 and is positioned with its pressure face in engagement with the end face 78 of the pusher 74. The pusher remains stationary in this position so that the nut blank is not moved during the initial portion of the tapping operation. The tap 87 is then fed forward into the stationary nut blank at a rate of feed which is equal to the lead of the thread being cut times the speed of rotation of the tap. This continues until the elements assume the position of FIGURE 6b. It has been found that when threading standard nuts, the tap should be rotated through six to eight turns while the blank is retained against the pusher.

Since the tap is accurately retained so that it rotates about the axis 79 and since the blank is stationary during the initial portion of thread cutting with its face against the accurately formed end face of the pusher, an accurately formed thread is provided which is perpendicular to the face of the nut. After the elements reach the position of FIGURE 6b, the tap is retracted while continuing to rotate. A sufficient thread has been formed by this time, so there is no tendency for the nut to become canted even if the surface of the hex is not absolutely perpendicular to the face. Therefore, the thread cutting continues as the tap is retracted. The pusher is simultaneously retracted to the initial position of FIGURE 6. This cycle is arranged so that there will be more than one nut being threaded at the same moment but sufficient spacing will be provided between the nuts to prevent binding or locking on the cutting end of the tap. This has the dual advantage of providing additional guiding for the tap as well as increasing the cyclic rate of the machine to increase the output.

It has been found in actual practice that machines incorporating this invention are capable of reliable operation in producing highly accurate nuts which meet the most stringent specification requirements as to thread dimension and thread direction when related to the face of the nut.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A tap assembly operable to tap nuts having a periphery with at least four corners and a central axial passage comprising a tap having a cutting end and a shank formed with a first portion coaxial with said cutting end and a second portion extending laterally therefrom, a pair of guide blocks rotating about a first axis each having a semi-circular cross-section groove with a radius of curvature equal to the radius at least as great as the radius of the nut periphery and a center of curvature, one of said blocks being mounted so that the center of curvature at one end of its groove is coaxial with said first axis, the other of said blocks being mounted with the center of curvature of its groove parallel to and spaced from the center of curvature of said one block.

2. A tapper assembly operable to tap nuts having a symmetrical periphery and a central axial passage comprising support means operable to support such nuts with their central passage concentric with a principal axis, a tap having a cutting end and a shank formed with the first portion coaxial with said cutting end and a second portion extending laterally therefrom, said first portion having a diameter providing a clearance with the threaded passage of a nut, a guide bushing formed with a cylindrical guide surface having a diameter providing a clearance with the periphery of said nut, said guide bushing being mounted with the center of its guide surface eccentric of said principal axis by an amount equal to one half of the sum of said clearances.

3. A nut tapper comprising a nut guide assembly operable to support a nut having external corners on a first axis for tapping, a tap support assembly, a tap supported by said tap support assembly having a guide shank having a first portion coaxial with said first axis and a second portion extending laterally thereof, drive means connected to said assemblies operable to produce relative rotation therebetween about said first axis and relative axial motion between a nut in said guide assembly and said tap whereby said tap threads said nut, said tap assembly including a guide bushing having a cylindrical guide surface having a radius greater than the radius of the corners of said nut, said first portion having a radius less than the radius of threads in said nuts, said bushing being mounted eccentric of said first axis by a distance substantially equal to one half the sum of clearances between said nuts and both said guide surface and first portion whereby said first portion is maintained coaxial with said first axis.

4. A nut tapper comprising a nut guide assembly operable to support a hexagonal nut against rotation with one end against a face perpendicular to a first axis, a tap support assembly rotating about said first axis, a tap supported by said tap support assembly having a guide shank having a first portion coaxial with said first axis and a second portion extending laterally thereof, drive means moving said tap support assembly along said first axis toward a nut in said guide assembly, said tap assembly including a pair of guide blocks each having a curved semi-circular cross-section groove having a radius of curvature at least as great as the radius of the corners of said nut and a center of curvature, one of said blocks being mounted so that the end of the center of curvature of its grove is coaxial with said first axis, the other of said blocks being mounted so that its center of curvature is parallel to and spaced from the center of curvature of said one block, and a guide bushing having a cylindrical guide surface having a radius substantially equal to the radius of said grooves and being mounted coaxial with the end of said center of curvature of said other block.

5. A nut tapper comprising a spindle rotating about a first axis and axially movable between a forward and a rearward position, a pusher having an end face perpendicular to said first axis axially aligned with said spindle and movable along said first axis between an advanced and a retracted position, stationary guides adapted to retain nuts in positions with their axes coaxial with said first axis and prevent rotation thereof while permitting axial motion of said nuts, a tap having a thread cutting end and a guide section, said guide section including a first portion on said first axis and a second portion extending laterally thereof, a rotating guide mounted on said spindle for rotation and axial movement therewith positioning nuts on said guide section and thereby positioning said tap with said cutter end on said first axis within said stationary guide, said guide cooperating with said second portion operating to axially locate said tap relative to said spindle and rotate said tap therewith, means supplying nut blanks to a position adjacent to said pusher, and a drive powered by spindle rotation operating said pusher to engage a nut blank with said end face and move to said advanced position, said pusher in cooperation with said guides holding such nut blanks in a stationary position against said end face, said drive thereafter threading said tap into such nut blank until said spindle is in said forward position and said cutting end extends into said nut a substantial distance, said drive thereafter moving said pusher to said retracted position and said spindle to said rearward position.

6. A tap assembly operable to tap nuts having a symmetrical periphery and a central axial passage comprising support means operable to support such nuts with their central passage concentric with a principal axis, a tap having a cutting end and a shank formed with the first portion coxial with said cutting end and a curved section extending laterally therefrom, a guide bushing formed with a cylindrical guide surface having a diameter larger than said nut periphery by a first predetermined clearance, said first portion having a diameter less than the diameter of the threads in said nuts by a second predetermined clearance, said bushing being mounted with said guide surface eccentric of said principal axis by an amount substantially equal to one half of the sum of said clearances, a pair of guide blocks each formed with a semi-circular groove having a radius substantially equal to the radius of said guide surface, one of said blocks being mounted adjacent said bushing with the center of curvature of its groove co-axial with said principal axis, the other of said blocks being mounted with the center of curvature of its groove spaced from and parallel to the center of curvature of the groove of said one block.

7. A tapper assembly operable to tap nuts having a symmetrical periphery and a central axial passage comprising support means operable to support such nuts with their central passage concentric with a principal axis, a tap having a cutting end and a shank formed with a first portion co-axial with said cutting end and a second portion extending laterally therefrom, said first portion having a diameter providing a clearance with the threaded passage of a nut, a guide member formed with a curved guide surface having a radius of curvature and a center of curvature, said radius of curvature being greater than the maximum radius of the periphery of said nut, said guide member being mounted with its center of curvature eccentric of said principal axis by an amount equal to one half said clearance plus the difference between the radius of curvature and the maximum radius of said nut.

References Cited by the Examiner

UNITED STATES PATENTS

| | | | |
|---|---|---|---|
| 1,736,581 | 11/29 | Crehan | 10—139 |
| 2,051,086 | 8/36 | Johnson | 10—129 |
| 2,111,295 | 3/38 | Mortus | 10—129 |
| 2,253,662 | 8/41 | Topolewski | 10—139 |
| 2,254,120 | 8/41 | Mortus et al. | |
| 2,580,187 | 12/51 | Nichols et al. | 10—139 |
| 2,651,792 | 9/53 | Gibney | 10—129 |

ANDREW R. JUHASZ, *Primary Examiner.*

EDWARD C. ALLEN, *Examiner.*